March 1, 1955
M. KADOSCH ET AL
2,702,986
DEVICE FOR DEFLECTING A FLUID FROM
ITS NORMAL DIRECTION OF FLOW
Filed Aug. 5, 1949
3 Sheets-Sheet 1
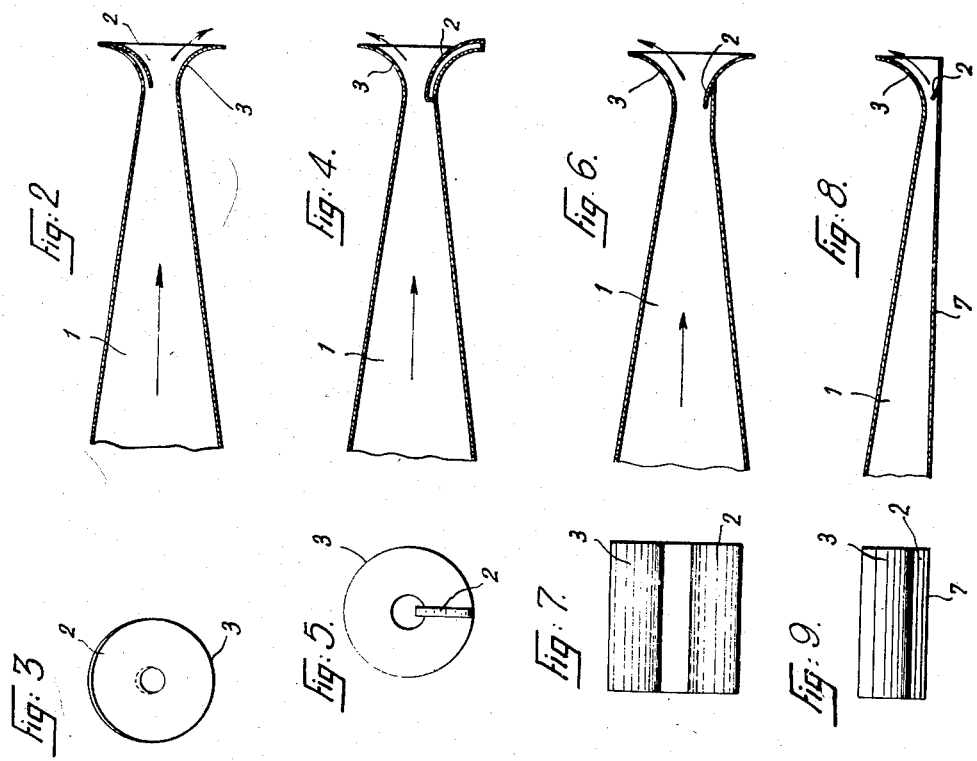
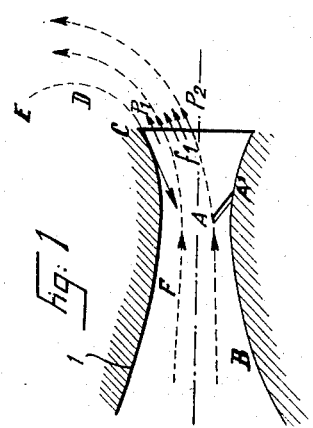

March 1, 1955
M. KADOSCH ET AL
2,702,986
DEVICE FOR DEFLECTING A FLUID FROM
ITS NORMAL DIRECTION OF FLOW
Filed Aug. 5, 1949
3 Sheets-Sheet 2
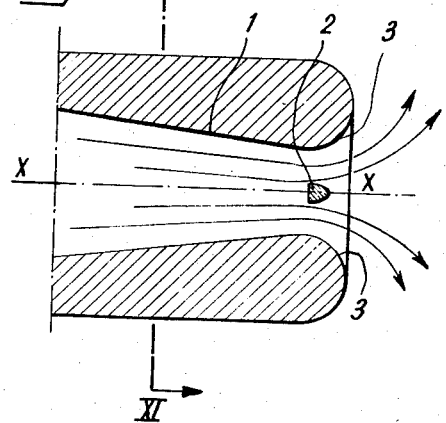
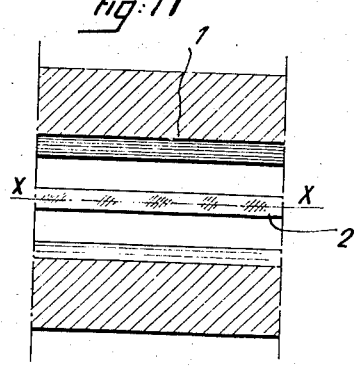
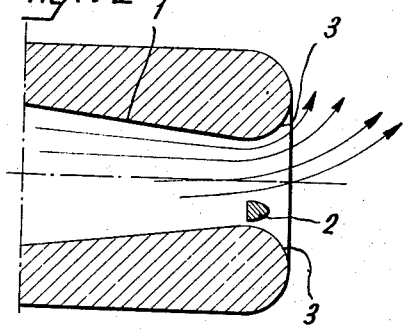
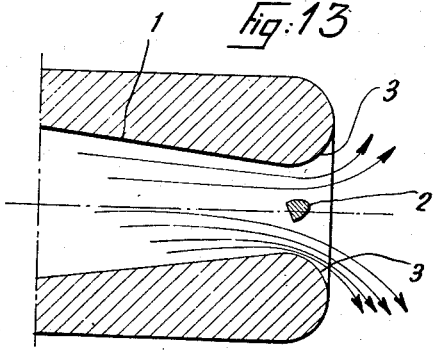
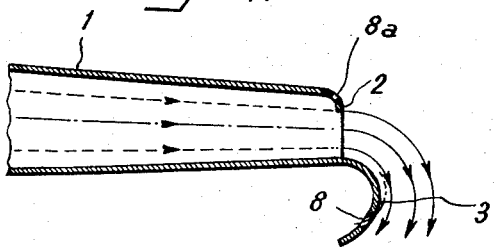

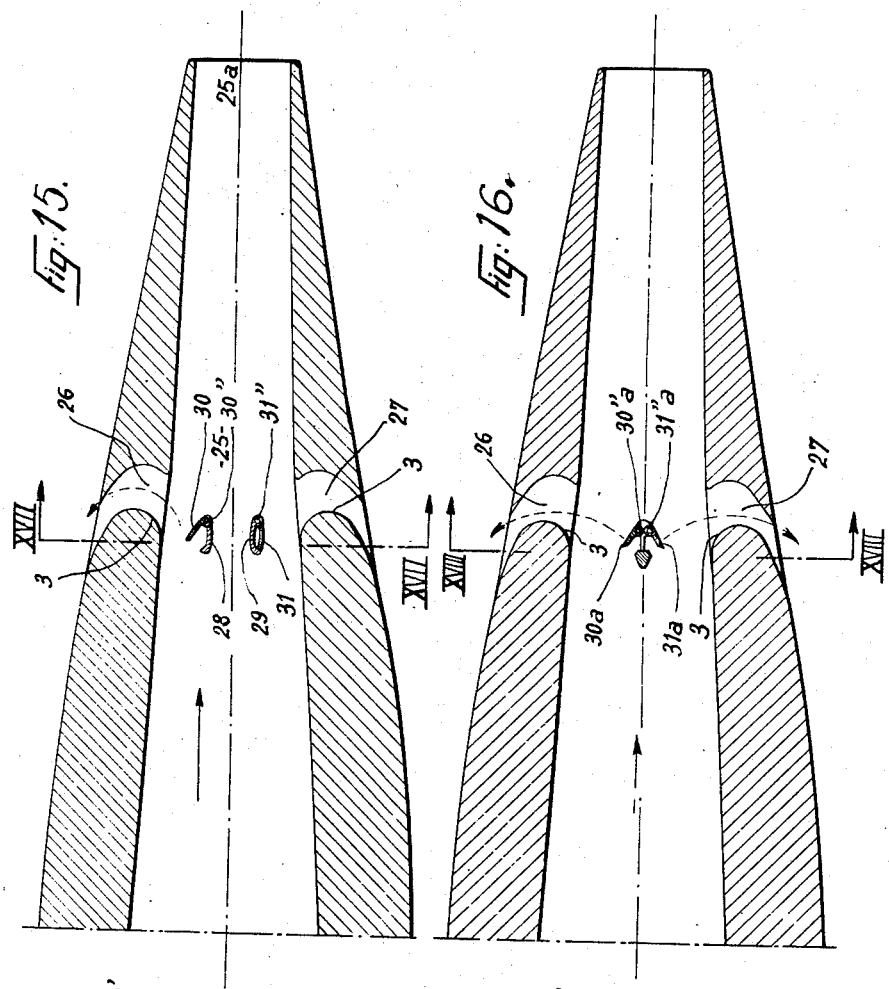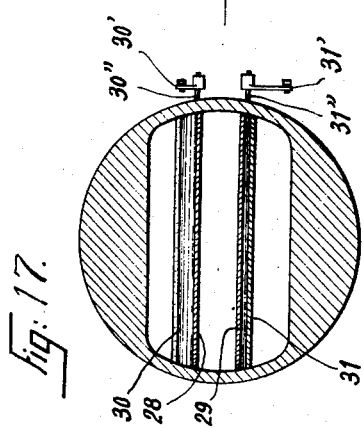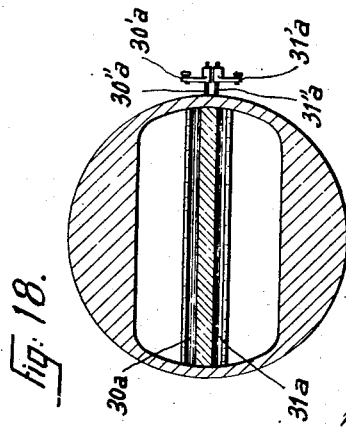

United States Patent Office 2,702,986
Patented Mar. 1, 1955

2,702,986

DEVICE FOR DEFLECTING A FLUID FROM ITS NORMAL DIRECTION OF FLOW

Marcel Kadosch, Paris, François G. Paris, Chaville, Jean H. Bertin, Neuilly-sur-Seine, and Raymond H. Marchal, Paris, France, assignors to Societe Nationale d'Etude et de Construction de Moteurs d'Aviation, Paris, France, a company of France Application August 5, 1949, Serial No. 108,758

Claims priority, application France August 11, 1948

14 Claims. (Cl. 60—35.54)

This invention relates to a device for deflecting a fluid from its normal direction of flow through a duct.

According to the invention the duct is provided, in its part where the deviation is to be achieved, with an outwardly curved convex extension tangential to the wall of said duct, and intercepting means are arranged in the fluid flow at a distance from the junction of said wall and said extension but in the vicinity of the transverse plane containing said junction, said intercepting means being located outside the path of the main portion of the flow adjacent the wall of the duct provided with said extension, whereby the passage cross-section of said portion through the duct remains unaltered.

The invention may be applied for instance to pulse jets for reducing the loss of gases through the inlet nozzle freely opened or to the rear nozzle of jet propulsion units for varying the direction and/or the value of the thrust; these applications are given only by way of example.

The invention is illustrated by way of example in the accompanying drawings, in which:

Figure 1 is an axial section of a nozzle for the flow of a fluid, illustrating the principle of the invention;

Figure 2 is an axial section of a nozzle according to the invention, for deflecting a jet flowing out of this nozzle;

Figure 3 is an end-view of Figure 2;

Figs. 4–5, 6–7, 8–9, are views similar to those of Figs. 2–3 and illustrating various form of the invention;

Figs. 10 and 11 are respectively an axial section and a cross-section along line XI—XI of Fig. 10 of a further form of the invention;

Figs. 12 and 13 relating to the form of Figs. 10 and 11, illustrate the result of altering the position of the deflecting obstacle;

Fig. 14 is an axial section of a nozzle provided with a slot for sucking up the limiting layer in order to increase deflection;

Figs. 15 and 16 are axial sections of an aircraft reaction-jet propeller nozzle provided with different deflecting devices according to the invention;

Figs. 17 and 18 are respectively cross-sections along lines XVII—XVII and XVIII—XVIII of Figs. 15 and 16.

In Fig. 1, a nozzle 1 through which a usually gaseous (but possibly liquid) fluid flows, has a converging-diverging shape. Under normal conditions, the mean direction of the jet is along the axis of the nozzle and the fluid is subjected to the variations in velocity and pressure according to fluid mechanics.

At the outlet of the nozzle, the desired deflection of the jet, for instance upward as in the case of Fig. 1, may be initiated by an asymmetric arrangement of the nozzle, for instance by means of an obstacle such as AA' located on the wall of the part of the nozzle opposite that along which the deflection is to be initiated.

This obstacle which, in the case of Fig. 1, is a partition angularly arranged on the wall of the nozzle in the vicinity of the neck, and slanting in the direction opposite to that of the fluid flow, causes the jet to be deflected by a local increase in pressure.

This deflection initiated by the obstacle AA' may be increased by suitably shaping the nozzle, down-stream with respect to the obstacle. For this purpose, the wall of the nozzle is provided with an outwardly curved convex extension on which the deflected jet tends to be applied as shown in CDE. The deviated jet tends to be applied on this rounded extension as a result of the friction and viscosity forces and of the transverse gradient of pressure. The pressure P1 near the extension is smaller than the pressure P2 near the outer surface; consequently the jet tends to follow the curve of the extension.

The deflection ends when the jet leaves the rounded extension. The phenomenon is similar to that occurring on the upper surface of a wing. The jet widens out on the rounded wall so that a uniform velocity for the whole jet is finally achieved.

In the form of the invention shown in Figs. 2 and 3 a nozzle 1 of circular cross-section and discharging for instance into the atmosphere, is provided, near its outlet, with an obstacle or fluid flow intercepting means 2 arranged in the vicinity of the neck or narrowest part of the nozzle and constituted by a thin partition protruding from the wall of the nozzle along a little over half its circumference, and a rounded portion 3 against which the deflection takes place.

The form of the invention shown in Figs. 4 and 5 is of the type shown in Figs. 2 and 3 but comprises an obstacle 2 of small width (see Fig. 5). For a convenient height, such an obstacle is sufficient to cause the jet to be deflected towards the curved wall 3.

Figs. 6 and 7 represent a rectangular nozzle having an obstacle located in 2 on one half of the wall on one side of the neck which has a rectangular cross-section.

The form of the invention shown in Figs. 8 and 9 relates to a nozzle having a rectangular cross-section and a flat side with an obstacle 2 protruding from the flat side 7 slightly down-stream with respect to the neck. Two nozzles of this kind may be associated along their flat sides, so as to give rise to two oppositely deflected jets.

Figs. 10 and 11 show a nozzle whose cross-section is not circular but symmetrical about a plane X—X (rectangular cross-section for instance). The deflection is obtained at the neck of this nozzle by means of an obstacle 2 arranged in the plane of symmetry X—X. This results in two jets deflected on either sides of the plane of symmetry along the curved surfaces 3.

It is possible to adjust the respective flows of the two jets, either by displacing the obstacle to one side; as shown in Fig. 12, or by giving the side of the obstacle facing upstream and having two sharp edges, an inclination to the side of the jet whose flow is to be increased (Fig. 13).

These movements of the obstacle are facilitated by the fact that the reaction exerted on it by the jet is weak.

Generally speaking, it should be noted that the position of the deflecting obstacle in the nozzle of the jet, as well as the height of said obstacle must be adjusted in order to obtain the optimum result.

If the duct is converging, it is advisable to arrange the obstacle at the neck or slightly down-stream with respect to it.

If the duct is diverging (its divergence should not exceed 7 to 10° in order to avoid an untimely separation of the jet from the wall), the obstacle should be placed upstream with respect to the point where the deflection is to take place.

Furthermore, it must be pointed out that, by sucking up the limiting layer of the deviated fluid, the deflection may be still further increased by moving forward the point of flow separation from the rounded surface.

Such a form of the invention is illustrated in Fig. 14 showing the nozzle 1, the deflecting obstacle 2, the rounded surface 3 along which flows the deflected jet, a slot 8 for sucking up the limiting layer and located in the wall in the vicinity of the point at which the deflected jet would otherwise leave the surface.

Slot 8 may also be located at the neck of the nozzle.

The sucking up of the limiting layer may be effected by the dynamical pressure of the fluid, without any special source of energy, slot 8 being in a projection on the wall and having a height transverse to the flow.

From another point of view, a leak 8a may be provided at the foot of the deflecting obstacle itself in order to eliminate the low speed fluid streamlines in the vicinity of the wall. This improves the deflection.

In every case, it is convenient for the slot designed to draw off the low speed streamlines, to have a height small enough in order not to decrease the pressure gradient which causes the flow separation.

Figs. 15 to 18 show the application of the invention to reaction-jet propellers for the purpose of varying the action of the propeller, for instance for decreasing the propelling thrust when landing and even to achieve a braking action.

In the form of the invention shown in Figs. 15 to 18, the reaction nozzle 25 having a rectangular cross-section whose major axis is horizontal, is provided on the upper and lower parts of its wall with two slots 26, 27.

Up-stream with respect to these slots, two horizontal deflectors are arranged each comprising a hinged flap 30, 31 actuated by a lever 30', 31' fast with an axle 30'', 31'' and which can be retracted in its support 28, 29 so as to form with it a stream-lined body unaffecting the jet (this case is illustrated by the lower deflector in Fig. 15), or on the contrary can be moved angularly away from its support thus constituting an obstacle to the flow of the jet (this case is illustrated by the upper deflector in Fig. 15). Instead of flowing towards the outlet 25a of the reaction nozzle, the part of the jet meeting obstacle 30 is deflected towards the corresponding slot 26. The propelling thrust given by the jet issuing from the normal outlet 25a of the nozzle is thus decreased this being very convenient for landing. The jet issuing from slot 26 gives rise to an additional reaction having a component directed vertically downwards which may help for instance in pancaking the aircraft to the ground during landing, whereas, if the jet is deflected by the lower deflector 29, 31 towards the lower slot 27, it gives a reaction having a component directed upwards and may increase the lift. By curving slots 26 and 27 so as to bend the deflected jet in the direction of motion it is possible to achieve a braking action.

With the double-deflector embodiment described a non-deflected jet passes between the two deflectors and gives a reaction along the axis of the nozzle.

In the form of the invention shown in Figs. 16 and 18, there is a single deflector at the centre, so that the simultaneous opening of both its flaps 30a and 31a makes possible the deflection of the jet wholly through the slots 26 and 27 in order to achieve a powerful braking action.

It is further possible to combine these embodiments by making both deflectors shown in Fig. 15 movable, so that they may progressively move away from or near to one another, or still rotate in a parallel direction to themselves so as to vary the output of one or the other of the deflected jets.

We claim:

1. In a jet propulsion nozzle adapted to form a flow of motive fluid in an axial direction with respect thereto, a device for deflecting at least a fraction of said flow from said axial direction comprising in combination a convex extension merging with and tangent to the wall of said nozzle and extending outwardly with respect to the axis thereof, the convexity of said extension facing downstream of the nozzle and obstacle means having a fluid intercepting surface extending generally opposite the part of the wall of said nozzle merging with said convex extension for urging said flow towards said part of the wall of said nozzle, said surface being adapted to intercept some of the streamlines of said flow while leaving unobstructed the greater portion of the cross-section of said nozzle, the fluid-intercepting surface of said obstacle means extending in a direction lying between a generally perpendicular direction with respect to the axis of said nozzle and an upstream direction generally parallel to said axis.

2. A deflecting device as claimed in claim 1, wherein the obstacle means is located at a distance from the part of the wall of said nozzle opposite the part thereof merging with said convex extension, whereby only the fraction of the flow between said obstacle means and said part merging with said convex extension is deflected along the latter.

3. A deflecting device as claimed in claim 1, wherein the obstacle means includes a solid body.

4. A deflecting device as claimed in claim 1, wherein the nozzle has two opposite walls each of which is associated with a convex extension merging with the corresponding wall, the parts of said walls merging with said convex extensions being opposite each other, and the obstacle means being symmetrically arranged inside said nozzle.

5. A deflecting device as claimed in claim 4, wherein the obstacle means includes two members hingedly connected to each other and forming a streamlined body when applied against each other and an obstacle forming body when set at an angle with respect to each other.

6. A deflecting device as claimed in claim 4, wherein the obstacle means includes two bodies spaced from each other and arranged on both sides of the axis of the nozzle, said bodies being adapted to only deflect the fractions of the flow between each body and the corresponding wall, while leaving unaffected the fraction of the flow between said bodies.

7. A deflecting device as claimed in claim 4, wherein the obstacles means lies on the axis of the nozzle.

8. A deflecting device as claimed in claim 1, further comprising sucking means on the convex extension for sucking up the boundary layer of the deflected flow.

9. A deflecting device as claimed in claim 1, wherein the nozzle has a converging-diverging shape and the obstacle means lies in the vicinity of the zone of minimum cross-section of said nozzle.

10. In a jet propulsion nozzle adapted to form a flow of motive gaseous fluid issuing into atmosphere in an axial direction with respect thereto, a device for deflecting at least a fraction of said flow from said axial direction, into atmosphere, at a substantial angle with said axial direction, comprising flow guiding means including a convex extension merging with a wall of said nozzle and extending outwardly with respect to the axis thereof, the convexity of said extension facing downstream of the nozzle, said flow guiding means opening into atmosphere at a substantial angle with the axis of said nozzle, and controllable obstacle means operatively associated with the nozzle and having a fluid-intercepting surface, adjustable to an inoperative position leaving unobstructed substantially the whole of the cross-section of said nozzle, whereby substantially no axially flowing streamline of said flow is intercepted, and to an operative position in which said fluid-intercepting surface extends partly across said nozzle, at a distance from said wall and upstream of at least a part of said convex extension, for intercepting some of the axially flowing streamlines of said flow while leaving wholly unobstructed a substantial portion of the cross-section of said nozzle, whereby the fluid flowing between said obstacle means and said wall is urged towards said flow guiding means and in contact with said convex extension.

11. In a jet propulsion nozzle adapted to form a flow of motive gaseous fluid issuing into atmosphere in an axial direction with respect thereto, a device for deflecting at least a fraction of said flow from said axial direction, into atmosphere, at a substantial angle with said axial direction, comprising flow guiding means including a convex extension merging with a wall of said nozzle and extending outwardly with respect to the axis thereof, the convexity of said extension facing downstream of the nozzle, said flow guiding means opening into atmosphere at a substantial angle with the axis of said nozzle, and controllable obstacle means operatively associated with the nozzle and having a fluid-intercepting surface, adjustable to an inoperative position leaving unobstructed substantially the whole of the cross-section of said nozzle, whereby substantially no axially flowing streamline of said flow is intercepted, and to an operative position in which said fluid-intercepting surface extends partly across said nozzle, at a distance from said wall and upstream of at least a part of said convex extension, for intercepting some of the axially flowing streamlines of said flow while leaving wholly unobstructed a substantial portion of the cross-section of said nozzle, the overall area of the projection of said surface, when in said operative position, on a plane perpendicular to the axis of said nozzle being substantially smaller than the cross-sectional area of said nozzle, whereby the fluid flowing between said obstacle means and said wall is urged towards said flow guiding means and in contact with said convex extension.

12. A deflecting device as claimed in claim 11, wherein the nozzle has two opposite walls each of which is associated with an outwardly extending, convex extension merging with it, said convex extensions and said obstacle means being substantially symmetrically disposed with respect to the axis of said nozzle.

13. A deflecting device as claimed in claim 11, wherein the obstacle means comprises two controllable, pivotally mounted, obstacle members substantially symmetrically disposed with respect to the axis of the nozzle, across same, at a distance from the wall thereof and upstream of at least a part of said convex extension, said members being angularly adjustable to an inoperative position in which they are generally parallel to said axis and form streamlined surfaces to the flow of fluid through said nozzle, and to an operative position in which they are at an angle with said axis and form fluid-intercepting surfaces.

14. A deflecting device as claimed in claim 11, wherein the flow guiding means forms a curved lateral passage opening into atmosphere and bounded by two opposite walls, one of which is formed by said convex extension and the other of which is formed by a concave surface downstream of said convex extension.

References Cited in the file of this patent

UNITED STATES PATENTS

| | | | |
|---|---|---|---|
| Re. 23,198 | Anxionnaz et al. | Feb. 21, | 1950 |
| 1,069,694 | Hayot | Aug. 12, | 1913 |
| 1,820,919 | Massey | Sept. 1, | 1931 |
| 1,879,187 | Goddard | Sept. 27, | 1932 |
| 2,037,940 | Stalker | Apr. 21, | 1936 |
| 2,075,817 | Loerke | Apr. 6, | 1937 |
| 2,108,652 | Coanda | Feb. 15, | 1938 |
| 2,195,044 | Zahren | Mar. 26, | 1940 |
| 2,224,260 | Galliot | Dec. 10, | 1940 |
| 2,244,453 | Föttinger et al. | June 3, | 1941 |
| 2,303,949 | Nordell | Dec. 1, | 1942 |
| 2,395,809 | Goddard | Mar. 5, | 1946 |
| 2,480,626 | Bodine | Aug. 30, | 1949 |
| 2,485,218 | Shaw | Oct. 18, | 1949 |

FOREIGN PATENTS

| | | | |
|---|---|---|---|
| 103,325 | Great Britain | Jan. 19, | 1917 |
| 50,033 | France | Aug. 1, | 1939 |

(Addition to No. 779,655)